United States Patent

Rodriguez

Patent Number: 5,288,401
Date of Patent: Feb. 22, 1994

[54] MAGNETIC INDUCTOR TO REVITALIZE WATER

[76] Inventor: Andres C. Rodriguez, Parque Residencial Ntra. Sra. de la Merced, Bloque 5-3°-C, Cadiz, Spain

[21] Appl. No.: 883,641

[22] Filed: May 15, 1992

[30] Foreign Application Priority Data

May 17, 1991 [ES] Spain .................. 9101527[U]
May 17, 1991 [ES] Spain .................. 9101528[U]

[51] Int. Cl.⁵ .............................................. C02F 1/48
[52] U.S. Cl. ...................................... 210/222; 210/249; 210/251
[58] Field of Search ............... 210/222, 223, 249, 251, 210/695; 141/339; 248/94, 300, 682; 55/100

[56] References Cited

U.S. PATENT DOCUMENTS

| | | | |
|---|---|---|---|
| 573,333 | 12/1896 | Krimmel | 141/339 |
| 2,277,738 | 3/1942 | Wilkinson | 210/249 |
| 2,652,925 | 9/1953 | Vermeiren | 210/222 |
| 5,055,188 | 10/1991 | Johnston et al. | 210/695 |

FOREIGN PATENT DOCUMENTS

| | | | |
|---|---|---|---|
| 76843 | 7/1976 | Japan | 210/222 |
| 180792 | 8/1987 | Japan | 210/222 |

Primary Examiner—Matthew O. Savage
Attorney, Agent, or Firm—Ostrolenk, Faber, Gerb & Soffen

[57] ABSTRACT

A magnetic inductor for revitalizing water including a housing which contains two sets of magnets. A chamber between the two sets of magnets contains a central baffle with holes. Water or other fluid enters the chamber through the center of one set of magnets. The flow is slowed inside the chamber by the baffle between the sets of magnets so that the fluid is exposed to the magnetic field in the chamber. The fluid then flows out of the chamber through the center of the second set of magnets. Vortex-shaped protrusions on the baffle assist in directing the fluid flow throughout the chamber. The magnets are protected from the fluid by the housing.

9 Claims, 4 Drawing Sheets

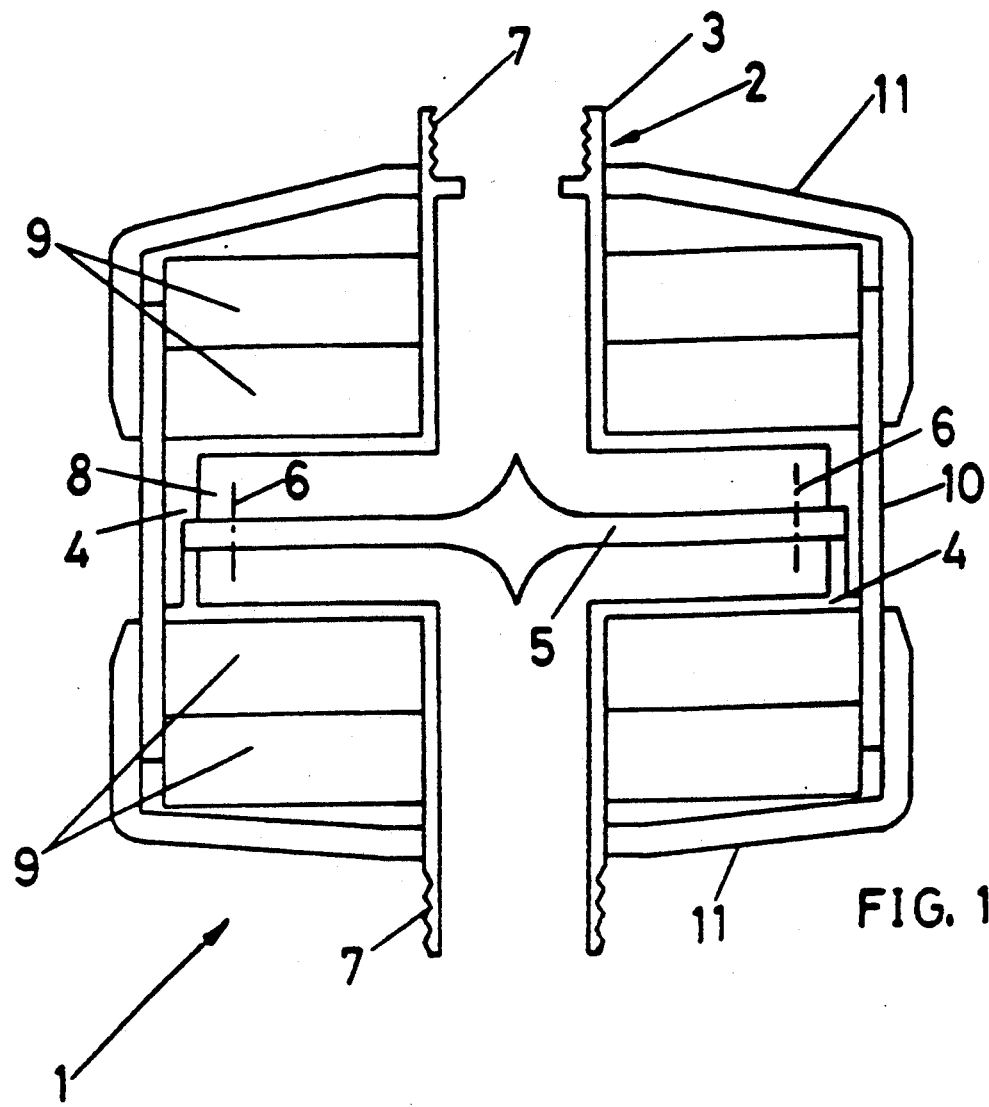
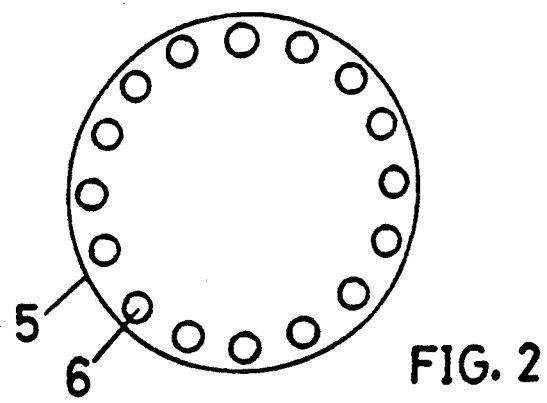

MAGNETIC INDUCTOR TO REVITALIZE WATER

The present invention refers to a magnetic inductor to revitalize water, being an apparatus device that, as its name implies, is intended to induce electro-magnetic current in the molecules of a water current circulating inside it and that passes through a powerful magnetic field, creating a series of permanent magnets. This physical circumstances causes the molecular structure of the water to undergo modifications so that the water acquires noticeable revitalizing and invigorating properties for living creatures that consume it. Furthermore, and as another important point to be noted, the calcium salts that are frequently found dissolved in drinking water precipitate in the form of amorphous slimes.

It is known that water is a liquid with many different physical behaviours in relation to other liquids until it reaches a temperature of 40 degrees C. when it then behaves as would be expected of a perfect liquid. In the interval of 0 to 40 degrees C. temperature is the key to its special behaviour.

Also, the quasi-crystalline structure of water appears to "trap" electromagnetic energies of low frequency and intensity, as has been demonstrated by research on this in the USSR, U.S.A. and JAPAN and in EUROPE through the conscientious work of Professor PICCARDI. Furthermore, the spectral analysis of water confirms wide absorption lines just within this frequency band.

It is known that the greatest instability of this delicate structure of water is reached between 35 and 40 degrees C., and therefore at these temperatures its receptiveness to magnetic perturbations appears to reach a maximum.

All the above indicates that water behaves as a highly sensitive receptor of electromagnetic disturbances of long wave length.

Therefore it is necessary to recover the beneficial properties of natural water as far as possible. Research has been undertaken on this to give a dynamic state to water by passing it through strong magnetic and electromagnetic fields, or by submitting it to electrostatic discharges. Water thus treated offers a series of beneficial effects for living creatures, animal and vegetable, that we can synthesize with the description of "regenerating and re-equilibrating effects", since the metabolic cellular processes appear to activate themselves favourable and thus all biological processes in general.

In this application, the water is given a dynamic state by the activation of strong magnetic fields created by permanent magnets. As is known, all magnetic fields are associated with another electrical field and therefore we can speak of electro-magnetic fields since the magnetic effect is simply the sum of an infinity of circular electrical micro-current originating from the orbiting of cortical electrons of atoms that, when synchronized with each other, add their powers together. This magnetic field is thus responsible for inducing low frequency and power waves, long waves, that are absorbed by the molecular structure of water running through that field.

Water submitted to this magnetic treatment is very useful for human consumption and has no type of side effects, rather it has notable diuretic, disintoxicating and general organism draining effects. It helps to improve metabolic tone, regulate hepato-biliary functions, aids in the elimination and expulsion of concretions and mineral deposits in body tissues and organs, and thus is beneficial for arthritic and rheumatic states and indicated for renal and biliary calculus, while also reducing levels of uric acid and cholesterol in the blood and giving rise to an increase in peristalsis so contributing to an improvement in the general digestive system; arterial pressure tends to normalize, the sympatic system improves its balance with favourable repercussions on the hormonal system, etc. When used externally, it contributes to the regeneration and deep cleaning of the skin, regulating its pH, and thus without doubt favours the termination of classic problems of skin health and aesthetics.

To summarise, it can be said that water treated magnetically, while not the solution to all health problems, can certainly contribute in raising vital tone and regulating biological mechanisms within the organism, as the said water recovers the virtues that nature gave it.

In some manner that is still unknown, water treated electromagnetically appears to work on the balance and ionics of the salts dissolved in it and, specifically, on calcium that instead of precipitating into calcite microcrystals change their crystallization system and precipitate into crystals of aragonite that easily separate forming amorphous slimes. Thus the effect is added to those considered above, giving magnetically treated water notable revitalizing qualities.

Finally, it may be added that magnetized water can be used with excellent results for watering plants, offering better and greater development and growth of the same.

The present device has been designed so that its daily use in domestic tasks may have a beneficial effect on the health of the user who can treat drinking water, and any other liquid with a water base, fruit juices, tisane, milk, coffee, etc.

According to the invention, the magnetic inductor is formed by two portions, equal and facing in an axial direction.

Each of the portions is formed by a central pipe widening at the end of cylindrical shape but hollow inside.

The end widening of both parts are constructed differently to aid in their male/female coupling and to hold within the wide part an internal disc that is placed in the central area of the chamber, which disc is perpendicular to the axis of the conduit that forms the two facing pipes of the two portions mentioned above.

The disc has concentric holes.

Each central pipe end has the means for coupling it to a water outlet or conduit, so that the device may be attached to a conduit for example a shower, or between water outlets and a pipe of the shower itself or the like.

The said pipes have ring shaped magnets by means of which the water passing through these pipes is magnetized. The intensity of the magnetic field can be increased by increasing the number of magnets as desired.

That fact that the disc has concentric holes implies that the water is obliged to pass through these holes, with the water remaining for a greater time in the magnetic field created by the magnets, than if it flowed directly though the pipe formed by the two facing tubes. This helps to achieve greater magnetic effect on the water, leading to a better treatment.

Another aspect of the invention consists of the magnetic inductor being formed by a central body and two ends.

The central body has two equal parts, facing axially, each of which is defined by a tubular portion with a cylindrical, central widening.

The end widenings of both portions are constructionally differentiated by a discoidal piece inside which is located in the central area of the chamber, and which disc is perpendicular to the axis of the pipe that forms the two facing tubular portions on the end pieces.

The disc has concentrically placed holes.

On each pipe portion is attached the tubular portions of the end bodies.

On the tubular portions of the central body are attached a series of magnets, variable in number, by means of which the water is magnetized.

The force of the magnetic field can be increased by a greater number of magnets.

The fact that the disc has concentric holes means that the water is obliged to pass through these holes, remaining a greater time within the magnetic field than if it circulated directly through the pipe made by the two facing tubular portions.

This form of construction helps to achieve a greater magnetic effect on the water.

Attached to one of the end bodies, on a tubular portion, is a funnel, preferably with an end cover that is attached to the body of the funnel by a hinge that allows the cover to turn and even be removed from the funnel to aid in cleaning it.

Also there is an accessory for the magnetic inductor consisting of a support in a general "C" shape in whose central part are holes through which screws are passed to hold the support to a surface such as a wall.

The other two branches of the "C" are of different length with facing cut outs of different size that aid in holding the inductor in the support.

In order to more easily understand not only the form but also the use of the magnetic inductor of the invention, reference is made below to a practical example, where said example is mere enunciative and in no case limits the same, all as shown in the drawings, in which:

FIG. 1 shows a sectional view of the inductor of the invention.

FIG. 2 shows a front view of the disc used in the internal centre part of the inductor.

Figure 3:
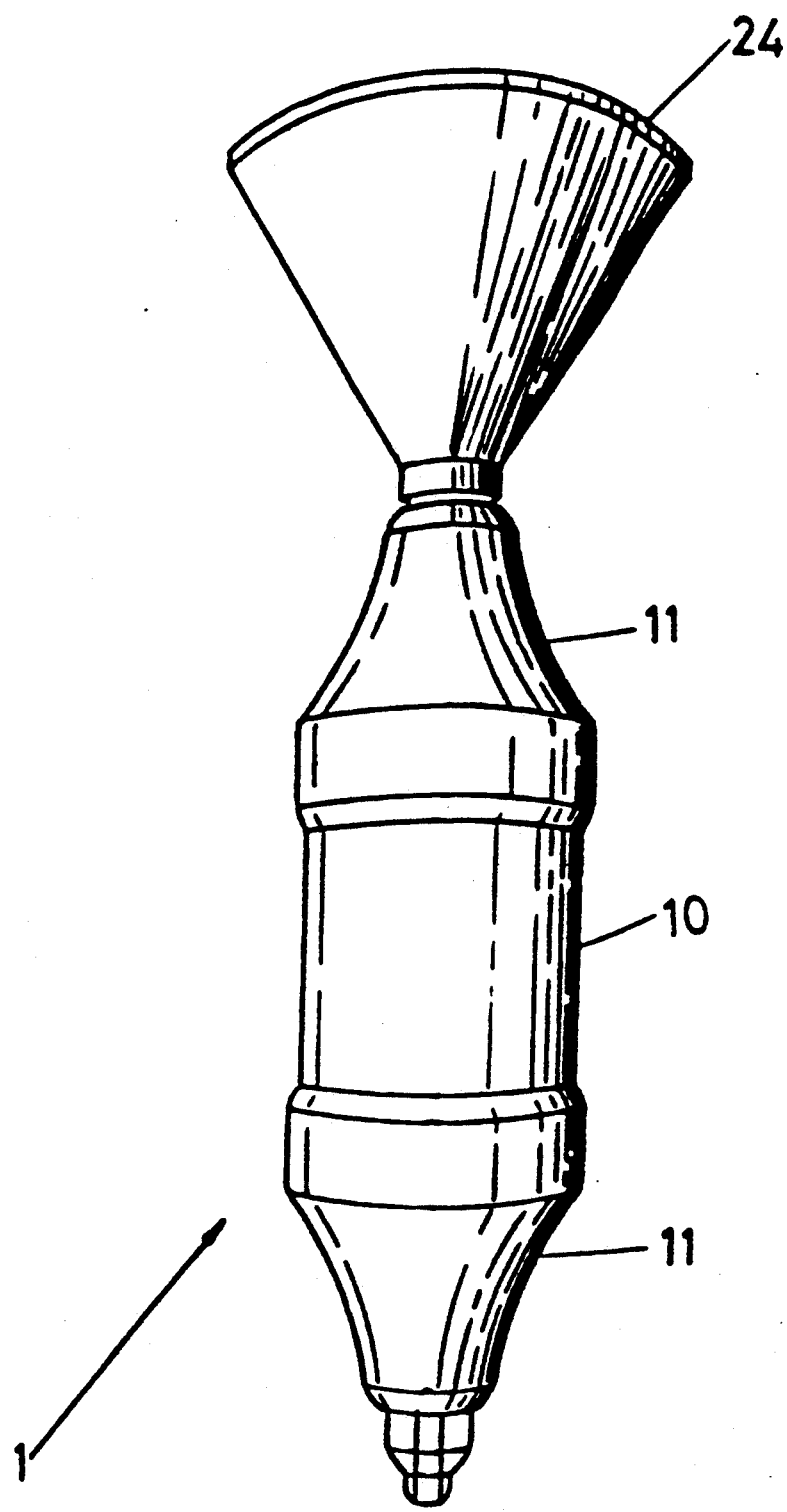
FIG. 3 shows a perspective view of the inductor of the invention.

The inductor 1 is formed by two facing parts related 2 to each other by their facing ends, each of which has a tubular portion 3 with a lateral cylindrical surface widening on the end 4.

These facing widenings on both parts allow a male/female coupling between them and also allow a central internal disc 5 to be fitted, with concentric holes 6 for the water to pass through. The center of the disc includes vortical protrusions on opposing sides to direct fluid flow, respectively, from the first tubular portion to the holes in the disc and from the holes in the disc to the second tubular portion.

The tubular portions 3 have end shapes 7 to hold the inductor to a water supply and outlet.

The water entering the inductor passes to the chamber 8 formed between the disc and the corresponding cylindrical prolongation 4, with the water being retained in this chamber, or the speed varies when it must pass through the holes 6, and thus the time it is exposed to the magnetic fields created by the magnets 9 placed in the tubular portions 3 is much greater, improving water treatment.

Also, the number of magnets that can be used is variable, although they are always in pairs.

The items described and which form the inductor, are placed in a lateral cylindrical body 10 with trunco-conical end extensions 11.

Figure 4:
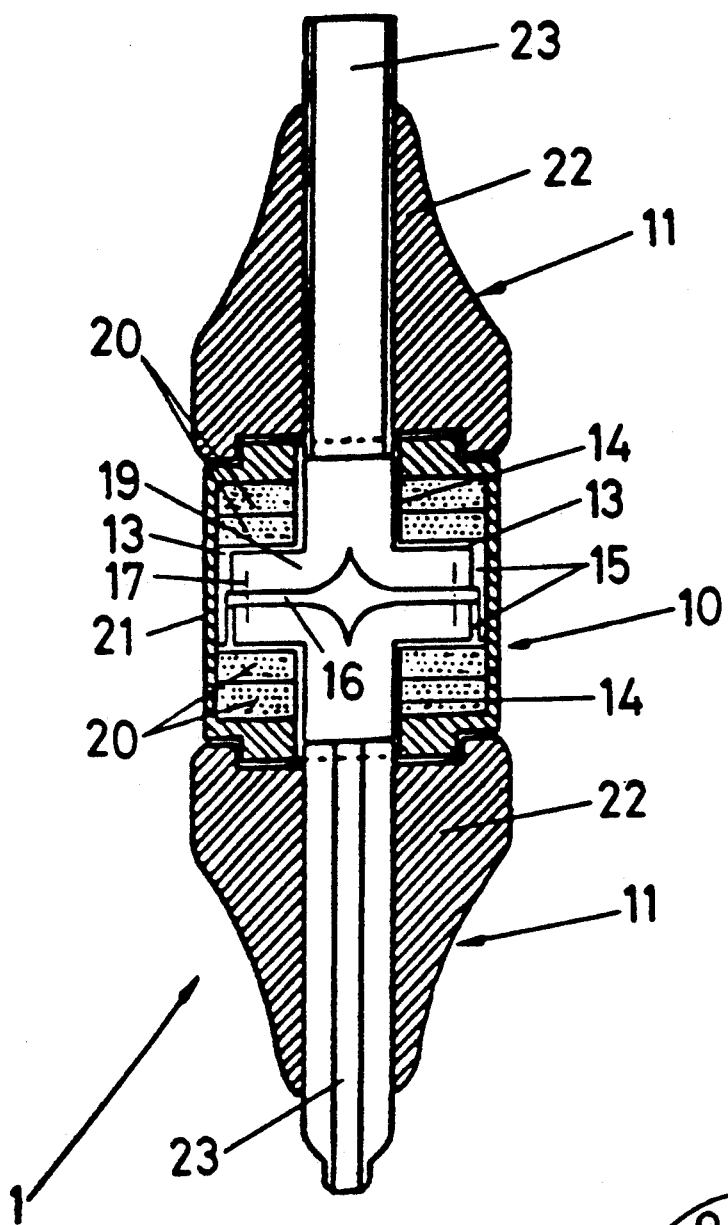
FIG. 4 shows a sectional view of the inductor in FIG. 1, without the funnel.
Figure 5:
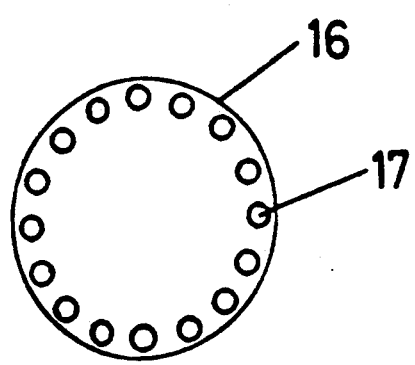
FIG. 5 shows a front view of the disc of the central inductor body.
Figure 6:
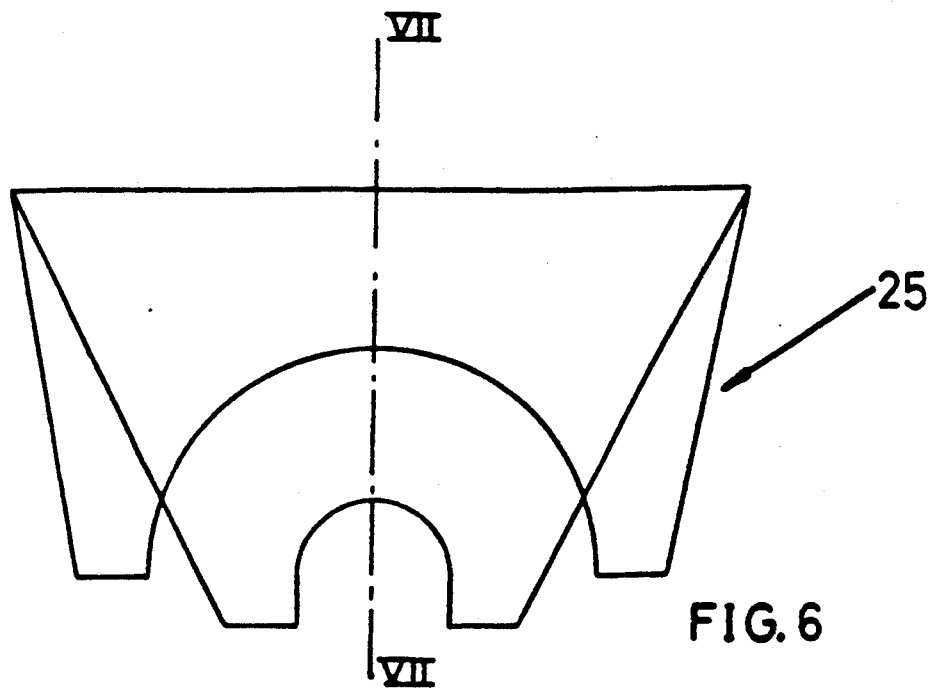
FIG. 6 shows a front view of the inductor support.
Figure 7:
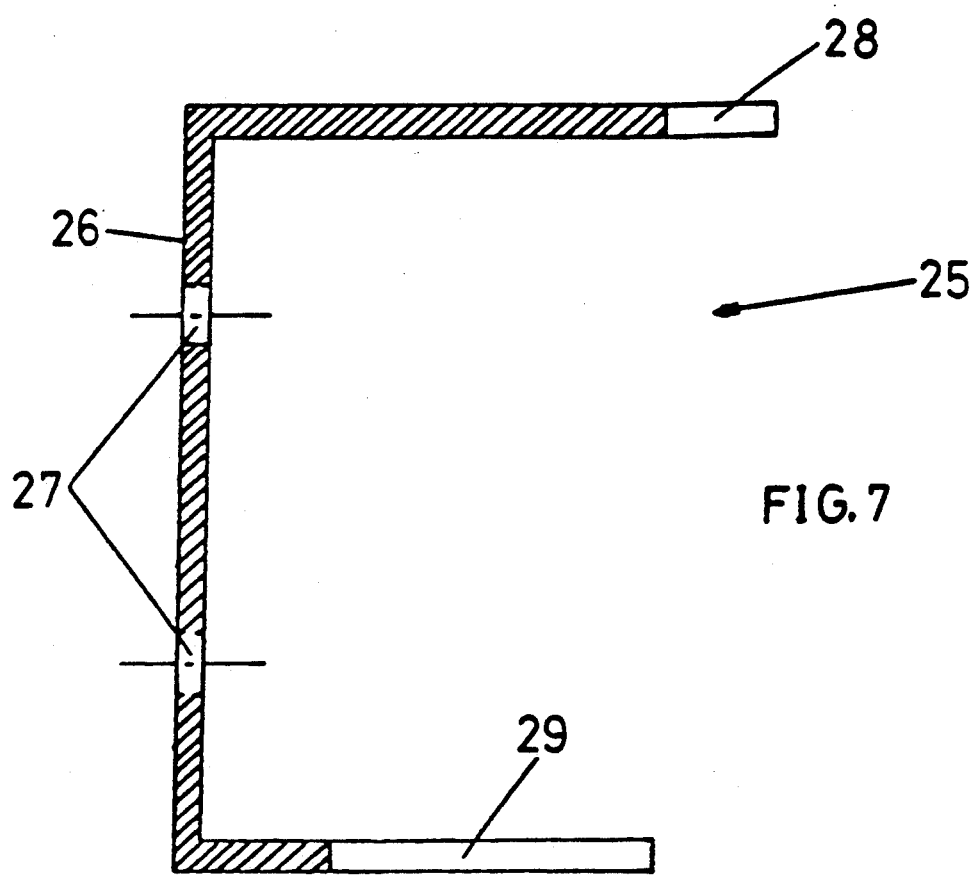
FIG. 7 shows a sectional view along the line VII—VII of FIG. 4.

The inductor 1 is formed by a central body 10 and another two ends 11, joined together as in FIGS. 3 and 4.

The central body 10 has two equal parts 13, each of which is formed by a tubular portion 14 and a cylindrical widening 15.

The two parts 13 are joined by male/female coupling at the widenings 15 and also in the coupling is positioned and fixed a discoidal part 16 with concentric holes 17, the disc 16 being the same size as the corresponding widening of a chamber 19.

In the tubular parts 14 magnets 20 are fixed and the group thus formed is placed inside a plastic mounting 21.

Each of the parts 13 are connected to a slightly trunco-conical body 22 by an axial hole through which a conduit 23 is passed that attaches to the ends of the tubular portions 14.

The water entering the conduit 23 reaches the chamber 19 and is there exposed to the magnetic field, since its speed varies when it is forced to pass through the holes 17 of the disc and the same happens at the outlet to the conduit 23.

The inductor 1 has a funnel 24 to aid in pouring water into the inductor.

This funnel may have a cover, not shown.

The inductor is placed in a support 25 that is generally "C" shaped, on whose central branch 26 are some holes 27 through which holding screws can attach it to the wall.

The support has two indents 28 and 29 to which the ends of one of the bodies 12 is attached.

Having sufficiently described the nature of the invention and the manner of putting it into practice, it must be noted that the above layouts indicated and represented in the attached drawings, may be modified in their details provided the basic principle is not altered.

I claim:

1. A magnetic inductor for water comprising:
    first and second conduit means for forming first and second conduits, respectively, which communicate with each other, the first conduit means having a first tubular portion extending toward the second conduit means and the second conduit means having a tubular portion extending toward the first conduit means, and the first and second tubular portions having respective end portions which face one another, said end portions being wider than the tubular portions coupling means for coupling said end portions together to define a sealed space therebetween, said sealed space communicating with an interior of said first and second tubular portions;
    first and second sets of magnets, each magnet having an aperture extending therethrough, said magnets being located externally of said sealed space, the apertures of said first set of magnets surrounding an outer surface of said first tubular portion and the apertures of the second set of magnets surrounding an outer surface of said second tubular portion;

a central internal disc positioned in said sealed space between said first and second sets of magnets and across the water flow passing from the first tubular portion to the second tubular, the disc having holes therethrough and the holes being located radially outward from a center of said disc so that the water in the space between the first and second tubular portions decreases speed to spend a relatively longer time in the magnetic field;

means for sealing a periphery of said disc to said coupling means;

wherein the first tubular portion is connected with a water inlet and the second tubular portion is connected with a water outlet, and the first tubular portion and the second tubular portion direct the water through the apertures of all the magnets of the inductor.

2. The inductor of claim 1, wherein the magnets are ring shaped magnets and extend around the tubular portion.

3. The inductor of claim 1, wherein the first and second conduit means and the first and second tubular portions are centered about a common axis; the central internal disc is perpendicular to said axis and to the flow of water and to the tubular portions; and said holes are equally spaced outward from a center of the disc.

4. The inductor of claim 3, wherein the inductor has housing means for defining a cylindrical lateral closing surface around a periphery thereof and has two end pieces at opposite ends of said housing means that forms a chassis of the inductor.

5. The inductor of claim 4, further comprising a funnel attached to the first tubular portion.

6. The inductor of claim 4, further comprising a generally C shaped support with hollows for receiving and holding the inductor.

7. The inductor of claim 1, wherein each aperture in each magnet is centrally located within each respective magnet.

8. The inductor of claim 1, wherein said coupling means is symmetrical about a plane containing said central internal disc.

9. The inductor of claim 1, wherein the center of said disc includes vortical protrusions on opposing sides to direct fluid flow, respectively, from the first tubular portion to the holes in said disc and from the holes in said disc to the second tubular portion.

* * * * *